United States Patent [19]
Kondoh et al.

[11] Patent Number: 5,329,413
[45] Date of Patent: Jul. 12, 1994

[54] MAGNETORESISTANCE SENSOR MAGNETICALLY COUPLED WITH HIGH-COERCIVE FORCE FILM AT TWO END REGIONS

[75] Inventors: Reiko Kondoh; Hitoshi Iwasaki, both of Yokohama; Junichi Akiyama, Kawasaki; Yuichi Ohsawa; Toshihiko Ohta, both of Yokohama, all of Japan

[73] Assignee: Kabushiki Kaisha Toshiba, Kawasaki, Japan

[21] Appl. No.: 712

[22] Filed: Jan. 5, 1993

[30] Foreign Application Priority Data

Jan. 10, 1992 [JP] Japan ............... 4-003140
Mar. 31, 1992 [JP] Japan ............... 4-076774

[51] Int. Cl.$^5$ ............................... G11B 5/39
[52] U.S. Cl. ............................... 360/113
[58] Field of Search .................. 360/113; 324/252

[56] References Cited

U.S. PATENT DOCUMENTS 3,840,898 10/1974 Bajorek et al.
4,103,315 7/1978 Hempstead et al.
4,785,366 11/1988 Krounbi .................. 360/113
5,005,096 4/1991 Krounbi et al.

OTHER PUBLICATIONS

IEEE Transactions on Magnetics, vol. 25, No. 5, Sep. 1989, C. Tsang, pp. 3692–3694, "Unshielded MR Elements with Patterned Exchange-Biasing".
Journal of Applied Physics, 69(8), 15, 1991, B. Dieny, et al., pp. 4774–4779, "Magnetotransport Properities of Magnetically Soft . . . ".
Physical Review B, vol. 45, No. 2, 1992, B. Dieny, et al., pp. 806–813, "Giant Magnetoresistance of Magnetically Soft Sandwiches . . . ".
IEEE Transactions on Magnetics, vol. MAG-20, No. 5, Sep. 1984, A. V. Pohm, et al., pp. 863–865, "Magnetization in Minimum Geometry M-R Heads with Multilayer Films".

*Primary Examiner*—A. J. Heinz
*Attorney, Agent, or Firm*—Oblon, Spivak, McClelland, Maier & Neustadt

[57] ABSTRACT

A magnetoresistance sensor of this invention is designed to detect a magnetic field on the basis of a change in electric resistance of a magnetoresistance layer, and includes a substrate, the magnetoresistance layer, a magnetization stabilizing layer for stabilizing magnetization of the magnetoresistance layer, and an electrical conductive layer formed on the magnetoresistance layer or the magnetization stabilizing layer. The sensor is characterized in that the magnetoresistance layer and the magnetization stabilizing layer are stacked on each other such that the layers are magnetically coupled to each other at their two end regions with an exchange coupling force higher than that at the remaining region. With this arrangement, there is provided a magnetoresistance sensor having high sensitivity, which can apply a desired bias magnetic field to the MR layer while preventing the bias magnetic field from being disturbed by a magnetic field from a magnetic recording medium or the like.

14 Claims, 5 Drawing Sheets

MAGNETORESISTANCE SENSOR MAGNETICALLY COUPLED WITH HIGH-COERCIVE FORCE FILM AT TWO END REGIONS

BACKGROUND OF THE INVENTION

1. Field of the Invention

The present invention relates to a magnetoresistance effect sensor used for a magnetic head and the like.

2. Description of the Related Art

In general, information recorded on a magnetic recording medium is read by moving a read magnetic head using a coil relative to the magnetic recording medium and detecting a voltage induced in the coil by electromagnetic induction caused by the relative movement of the coil. It is also known that a magnetoresistance type head is used for an information reading operation [IEEE MAG-7, 150, (1971)]. This magnetoresistance type head uses the phenomenon that the electric resistance of a ferromagnetic material of a certain type changes in accordance with the strength of an external magnetic field. This type of head is used as a high-sensitivity head for a magnetic recording medium. With the recent tendency to reduce the size of a magnetic recording medium while increasing its capacity, the speed of the read magnetic head relative to the magnetic recording medium is decreased. Therefore, demand for a magnetoresistance type head (to be referred to as an MR head hereinafter) capable of extracting a large output at a low relative speed is high.

MR elements used for MR heads include a single-layer MR element and a multilayer MR element which exhibits a larger magnetoresistance change than the single-layer MR film. The following types of multilayer MR elements are available. The first type of multilayer MR element is designed to exhibit a large magnetoresistance change by using the difference between the different coercive forces of two types of magnetic films which are arranged such that the magnetization of one film is antiparallel to that of the other film [The Journal of the Institute of Applied Magnetics of Japan Vol. 15, No. 5813 (1991)] (non-exchange coupled type).

The second type of multilayer MR element has a multilayer film constituted by two ferromagnetic films sandwiching a nonmagnetic film. In this element, an exchange bias based on an antiferromagnetic film is applied onto one ferromagnetic film of the multilayer film to fix its magnetization, and the magnetization of the other ferromagnetic film is inverted by an external magnetic field. As a result, the directions of magnetization of the two ferromagnetic films sandwiching the nonmagnetic film become parallel or antiparallel to each other, exhibiting a large magnetoresistance change [Phys. Rev. B., Vol. 4580, (1992)]; [J. Appl, Phys., Vol. 69, 4774 (1991)] (spin valve type).

In the third type of multilayer MR film, an antiparallel state of magnetization is obtained by a current magnetic field formed by a sense current, and a large magnetoresistance change occurs due to the difference between the antiparallel state and a parallel state of magnetization obtained by a signal magnetic field [IEEE TRANSACTION ON MAGNETICS Vol. MAG-20, No. 5,863 (1984)] (depth current scheme).

When an MR head is actually used, two types of bias magnetic fields must be applied to the MR element. One bias magnetic field is applied to the MR element in a direction perpendicular to the sense current flowing in the element and is generally called a transverse bias. The transverse bias is a magnetic field used to achieve a state wherein the magnitude of an external signal becomes proportional to that of a detected signal, i.e., a so-called operating point.

The other bias magnetic field is applied to the MR element in a direction parallel to the sense current and is generally called a longitudinal bias. The longitudinal bias serves to suppress Barkhausen noise which is generated due to the multi-domain characteristics of the MR element.

As methods of applying such a longitudinal bias, methods of using a magnetized ferromagnetic film have been proposed. For example, U.S. Pat. No. 3,840,898 discloses a method of applying a longitudinal bias to an MR layer, in which the MR layer is arranged to be adjacent to a magnetized hard film through a thin insulating film. According to this method, by selecting a magnetizing direction, a longitudinal bias or a transverse bias can be selectively applied, or a bias can be applied even in a direction therebetween. In addition, U.S. Pat. No. 4,103,315 discloses that a uniform longitudinal bias is generated in an MR layer upon exchange coupling between an antiferromagnetic film and a ferromagnetic film. It is also reported in JOURNAL OF APPLIED PHYSICS Vol. 52, 2474 (1981) that when an FeMn alloy film is used as an antiferromagnetic film, a longitudinal bias is applied to the MR layer.

On the other hand, it is preferable that a relatively weak longitudinal bias be applied to a central portion of an MR layer, i.e., a so-called active region, as compared with a bias applied to its end portion. This is because an excessive longitudinal bias magnetic field in a signal magnetic field causes a deterioration in sensitivity. Magnetic Recording Research Institute MR86-37 of the Institute of Electronics and Communication Engineers discloses a structure in which a high-coercive-force film as a magnetization stabilizing film is formed on only an end region of an MR layer. In this structure, a magnetized CoPt film is arranged on an end portion of the MR layer of a yoke type MR head to apply a longitudinal bias. In addition, it is reported in IEEE TRANS. MAG-25, 3692 (1989) that even if an FeMn film is formed on only an end portion of an MR layer, a longitudinal bias is applied to the active region of the MR layer.

As described above, several methods of applying a longitudinal bias to an MR element have been proposed. However, if these methods are applied to a magnetic head for a hard disk drive, the following problems are posed.

When a magnetization stabilizing film is formed on the entire surface of an MR layer, a strong bias magnetic field is applied to the active region, resulting in a deterioration in sensitivity. In contrast to this, when a magnetization stabilizing film is formed on only an end portion of an MR layer, the following three problems are posed. First, when a magnetization stabilizing film is a high-coercive-force film, as shown in FIG. 1, positive or negative magnetization occurs in an end face 12 crossing the direction of magnetization of a high-coercive-force film 11 patterned on an MR layer 10, and the resulting leakage magnetic field adversely affects the MR layer 10, thus interfering with the stabilization of magnetization of the MR layer. Second, when a magnetization stabilizing film is formed on only an end portion of an MR layer by patterning, a film having a thickness of several tens of nanometers is subjected to ion milling. In patterning, therefore, the MR layer may be damaged. That is, the formation of such a film is difficult as a process. Third, assume that a high-coercive-force film having a thickness of about 20 nm or more is formed on only an end portion of an MR layer. In this case, if an MR layer having a thickness of about 30 nm is formed on the high-coercive-force film, conspicuous stepped portions are formed on the MR layer owing to the influence of the underlying layer. This causes a deterioration in the characteristics of the MR layer. In such a case, therefore, a high-coercive-force film is preferably formed on an MR layer. However, since an NiFe film as an MR layer promotes the c-axis orientation of a Co-based film as a high-coercive-force film, it is difficult to apply a longitudinal bias magnetic field.

SUMMARY OF THE INVENTION

It is an object of the present invention to provide a magnetoresistance sensor having high sensitivity, which can apply a desired bias magnetic field to an MR layer while preventing the bias magnetic field from being disturbed by a magnetic field from a magnetic recording medium.

In order to achieve the above object, according to the present invention, there is provided a magnetoresistance sensor for detecting a magnetic field on the basis of a change in electric resistance of a magnetoresistance layer, comprising a substrate, the magnetoresistance layer, a magnetization stabilizing layer for stabilizing magnetization of the magnetoresistance layer, and an electrical conductive layer formed on the magnetoresistance layer or the magnetization stabilizing layer, wherein the magnetoresistance layer and the magnetization stabilizing layer are stacked on each other such that the layers are magnetically coupled to each other at two end regions thereof with an exchange coupling force higher than that at a remaining region.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 1:
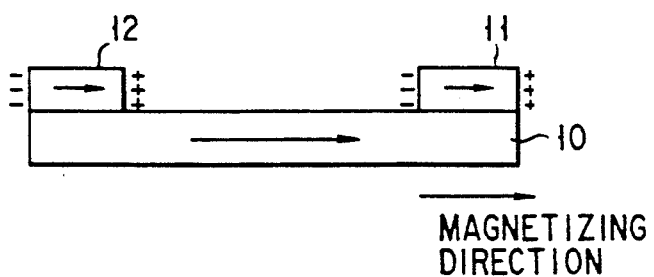
FIG. 1 is a sectional view for explaining a conventional magnetoresistance sensor.

A magnetoresistance sensor of the present invention is characterized in that a magnetoresistance layer (MR layer) and a magnetization stabilizing layer for stabilizing the MR layer are stacked on each other in such a manner that the two end portions of the resultant structure are magnetically set in an exchange coupling state, while an active region is magnetically set in a non-exchange coupling state.

With this arrangement, a bias magnetic field which is strong enough to cancel a demagnetized field can be applied to only an end portion of the MR layer, while an excessive longitudinal bias magnetic field which causes a deterioration in the sensitivity of the magnetoresistance sensor can be suppressed at the active region. In addition, since a thin layer can be used as a magnetic insulating layer for breaking the exchange coupling force acting between the MR layer and the magnetization stabilizing layer, a great reduction in leakage magnetic field can be achieved, thus preventing the adverse influence of a leakage magnetic field on the sensor. Furthermore, since the thin magnetic insulating layer can reduce the stepped portion, a deterioration in the characteristics of the magnetization stabilizing layer or the MR layer can be prevented. Moreover, the magnetoresistance sensor having the above arrangement is easy to manufacture.

In this case, as a material for a substrate, a ceramic material containing $Al_2O_3$ as a main component or a ferrite material can be used.

As a material for a magnetoresistance layer, an NiFe alloy or the like can be used. As a material for an electrical conductive layer, Cu, Ti, Ta, or the like can be used.

A magnetization stabilizing layer means an antiferromagnetic film, a high-coercive-force film, an artificial lattice film exhibiting antiferromagnetic coupling between magnetic films, and the like. As a material for an antiferromagnetic film, FeMn, NiO, or the like can be used. As a material for a high-coercive-force film, CoPt, CoCr, or the like can be used. As a material for an artificial lattice film, Co/Cu, Fe/Cr, or the like, disclosed in Journal of Magnetism and Magnetic Materials 94(1991)L1-L5 can be used.

The exchange and non-exchange coupling portions of the magnetoresistance sensor of the present invention are manufactured as follows.

An undercoating layer designed for orientation control of a magnetization stabilizing layer is formed first on a substrate. As the undercoating layer, a Cr film or the like is used. A CoCr film is formed on the undercoating layer by deposition or sputtering, thus forming a magnetization stabilizing layer. Subsequently, a magnetic insulating layer is formed on the magnetization stabilizing layer to have a desired width by, e.g., a lift-off method. Alternatively, the magnetization stabilizing layer is patterned by an ion milling method or the like to form an active region. As a material for the magnetic insulating layer, Ta, Nb, $SiO_2$, or the like can be used. The thickness of the magnetic insulating layer may be set to be large enough to break the exchange coupling force acting between the magnetization stabilizing layer and an MR layer, e.g., 1 to 10 nm. Subsequently, for example, an NiFe film is formed on the resultant structure by deposition, sputtering, or the like, thereby forming an MR layer.

With this structure, since the MR layer and the magnetization stabilizing layer are stacked on each other through the magnetic insulating layer at the position of the active region. The active region is set in a non-exchange coupling state. In contrast to this, since the MR layer and the magnetization stabilizing layer are stacked on each other without the mediacy of the magnetic insulating layer at the positions of the two end portions of the sensor, the two end portions are set in an exchange coupling state.

Note that the order of formation of the magnetization stabilizing layer and the MR layer is not specifically limited. That is, the above order may be reversed such that these layers are formed upon formation of the magnetic insulating layer and the like.

As a method of applying a transverse bias, a shunt bias method, a SAL bias method using a soft magnetic film, or the like can be used.

Embodiments of the present invention will be described in detail below with reference to the accompanying drawings.

EXAMPLE 1

Figure 2:
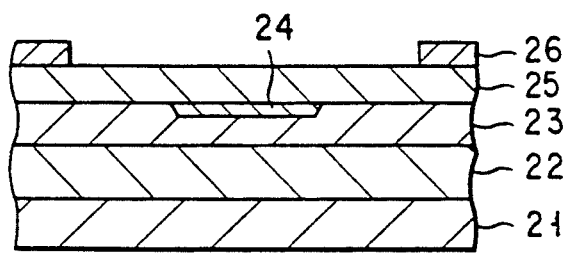
FIG. 2 is a sectional view showing a magneto-resistance sensor according to an embodiment of the present invention.

FIG. 2 is a sectional view showing a magnetoresistance sensor (MR sensor) according to an embodiment of the present invention. Referring to FIG. 1, reference numeral 21 denotes a substrate. An undercoating layer 22 consisting of Cr or the like is formed on the substrate 21. The undercoating layer 22 serves to control the orientation of a high-coercive-force film. A high-coercive-force film 23 consisting of a CoCr alloy or the like is formed on the undercoating layer 22. An oxide film 24 is formed in a central region, i.e., an active region, of the high-coercive-force film 23. An MR layer 25 consisting of an NiFe alloy or the like is formed on the high-coercive-force film 23 including the oxide film 24. In addition, an electrical conductive film 26 for supplying a current to the MR layer 25 is formed on a partial region of the MR layer 25. By selecting and setting such a structure, the undercoating layer 22 can control the orientation of the high-coercive-force film 23 and also serves as a shunt bias layer.

Figure 3A:
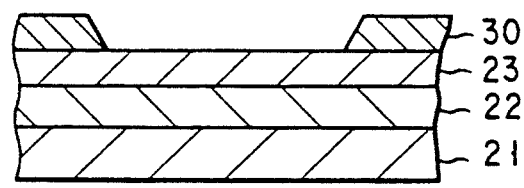
FIGS. 3A to 3D are sectional views for explaining a method of manufacturing a magnetoresistance sensor according to the present invention.

FIGS. 3A to 3D are sectional views for explaining a method of manufacturing the MR sensor according to an embodiment of the present invention. As shown in FIG. 3A, for example, a Cr film is formed on the substrate 21 to have a thickness about 0.1 $\mu$m, thus forming the undercoating layer 22. A CoCr alloy film or the like is formed, as the high-coercive-force film 23, on the undercoating layer 22 by deposition or sputtering. A mask 30 consisting of Cr or the like is formed on a region, of the high-coercive-force film 23, other than an active region.

Figure 3B:
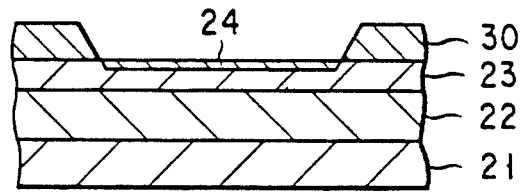

Subsequently, as shown in FIG. 3B, the resultant structure is heat-treated in an oxygen atmosphere to oxidize the high-coercive-force film 23, thus forming the oxide film 24 having a thickness of about 2 nm or more. In this case, instead of performing a heat treatment, for example, oxygen ions may be implanted into the high-coercive-force film 23 to make a corresponding portion nonmagnetic, thereby forming a nonmagnetic layer in the high-coercive-force film 23.

Figure 3C:
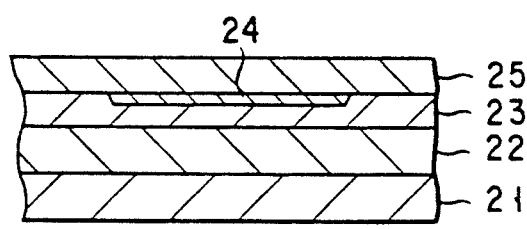

As shown in FIG. 3C, the Cr film as the mask 30 is removed by using an etching solution exhibiting high selectivity with respect to the high-coercive-force film 23. An NiFe alloy film or the like is then formed on the resultant structure by deposition or sputtering to form the MR layer 25. In this case, since the high-coercive-force film 23 and the MR layer 25 must be set in an exchange coupling state at the end portions of the high-coercive-force film 23, i.e., the portions where the mask 30 is formed, reverse sputter etching is preferably performed to a degree that the oxide film 24 having a desired thickness (about 2 nm) is left, before the MR layer 25 is formed.

Figure 3D:
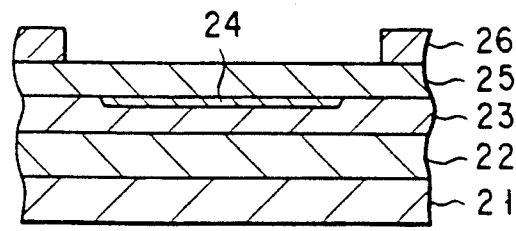

As shown in FIG. 3D, an electrical conductive film 26 as a lead is formed by patterning.

Even if an antiferromagnetic film is used in place of the high-coercive-force film 23, an MR sensor can be manufactured by the same method as described above. In this case, if, for example, an FeMn film is used as an antiferromagnetic film, an undercoating layer suitable for the growth of $\gamma$-FeMn which is exchange-coupled to an MR layer can be selected.

Since the oxide film 24 as a nonmagnetic layer is as thin as about 2 nm which magnetically causes non-exchange coupling, the above-described manufacturing method can be employed. In addition, since the oxide film 24 is thin, the adverse influence of a leakage magnetic field can be prevented. Furthermore, with the above manufacturing method, since stepped portions due to the oxide film 24 are not formed, a deterioration in the characteristics of the MR layer can be prevented.

EXAMPLE 2

Figure 4A:
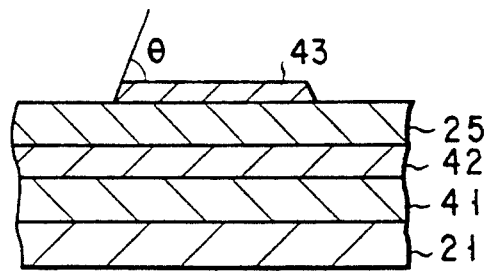
FIGS. 4A to 4C, 6A to 6D, and 7A to 7E are sectional views for explaining other methods of manufacturing magnetoresistance sensors according to the present invention.
Figure 4B:
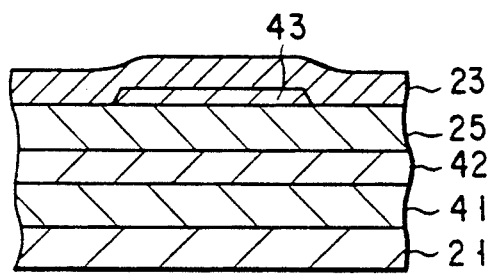
Figure 4C:
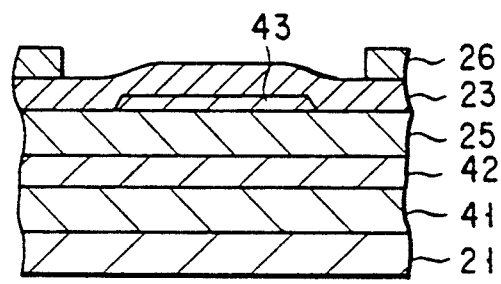

FIGS. 4A to 4C are sectional views for explaining a method of manufacturing an MR sensor according to another embodiment of the present invention. As shown in FIG. 4A, a bias current layer 41 consisting of Ta, Ti, or the like, and a high-resistance layer 42 consisting of TiN, TiO$_2$, or the like are sequentially formed on a substrate 21. A shunt bias layer is constituted by the bias current layer 41 and the high-resistance layer 42. An MR layer 25 is then formed on the shunt bias layer by deposition or sputtering. A magnetic insulating layer 43 consisting of a nonmagnetic material such as Ti or SiO$_2$ is formed on an active region of the MR layer 25.

Figure 5:
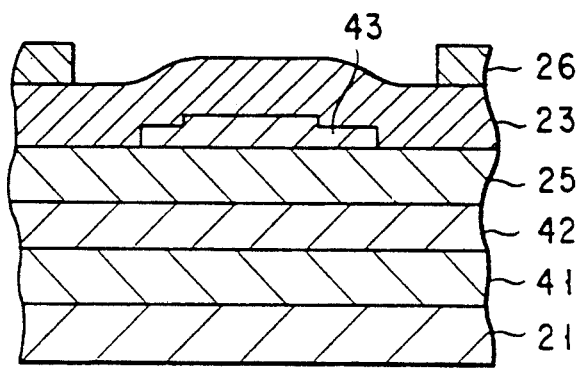
FIGS. 5, 8, 9, and 10 are sectional views showing magnetoresistance sensors according to other embodiments of the present invention.

At this time, each end portion of the magnetic insulating layer 43 may be vertical ($\theta = 90°$) with respect to the surface of the MR layer 25. In this case, however, a high-coercive-force film 23 formed on each end portion of the magnetic insulating layer 43 may not have a sufficient thickness. For this reason, each end portion of the magnetic insulating layer 43 is preferably tapered ($\theta < 90°$). In addition, if the magnetic insulating layer 43 is formed while the position of mask is moved, stepped portions can be formed, as shown in FIG. 5.

Subsequently, as shown in FIG. 4B, the high-coercive-force film 23 is formed on the MR layer 25 including the magnetic insulating layer 43 by deposition or sputtering. At this time, since the high-coercive-force film 23 and the MR layer 25 must be set in an exchange coupling state at each end portion of the MR layer 25, the high-coercive-force film 23 is preferably formed after reverse sputter etching is performed to a degree that the magnetic insulating layer 43 having a desired thickness is left.

As shown in FIG. 4C, an electrical conductive film 26 as a lead is formed by patterning.

Note that even if an antiferromagnetic film is used in place of the high-coercive-force film 23, an MR sensor can be manufactured by the same method as described above. A high-coercive-force film can be formed in the same manner as described above, even if an antiferromagnetic film is used.

Since the magnetic insulating layer 43 as a non-magnetic layer is a thin film having a thickness of about 2 nm, patterning by the ion milling method can be easily performed. This layer can also be formed by the lift-off method. Since the magnetic insulating layer consisting of Ti SiO$_2$, or the like can be thin, no leakage magnetic field is generated. Therefore, the adverse influence of a leakage magnetic field can be prevented. In addition, since the magnetic insulating film having a thickness of about 2 nm is thin as compared with the high-coercive-force film which has a thickness of about 40 nm, a deterioration in the characteristics of the high-coercive-force film can be prevented.

As described above, the magnetic insulating film preferably has a small thickness and a small taper angle $\theta$ in terms of the prevention of a leakage magnetic field, the reduction of a stepped portion, and the like. A method of manufacturing a magnetic insulating layer whose taper angle $\theta$ is 30° or less will be described below.

Figure 6A:
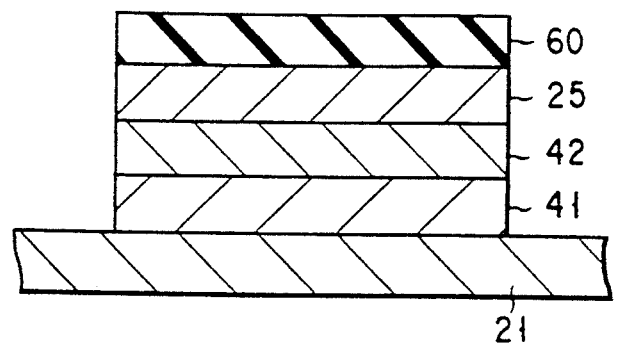

The bias current layer 41, the high-resistance layer 42, and the MR layer 25 are sequentially formed on the substrate 21 in the same manner as described above. As shown in FIG. 6A an SiO$_2$ film is then formed on the MR layer 25 by sputtering or the like, thus forming a magnetic insulating layer 60 having a thickness of 3 nm. In addition, an SiN film 61 having a thickness of about 1 nm is formed on the magnetic insulating layer 60 by sputtering or the like. The SiN film 61 is used as a mask for patterning the magnetic insulating layer 60. In addition, as shown in FIG. 6B, a resist layer 62 is formed on the SiN film 61 and is patterned into a desired shape, thus forming a mask.

Figure 6B:
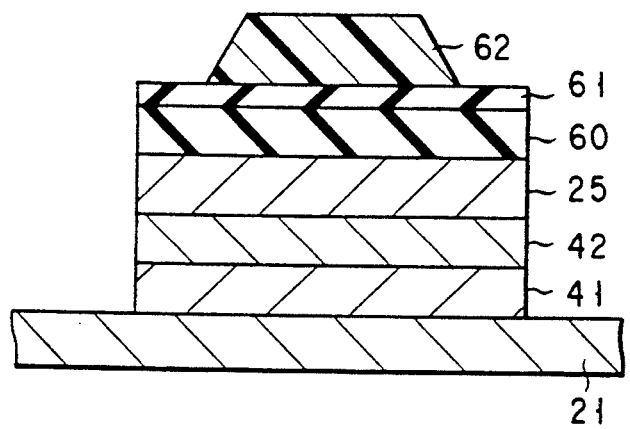
Figure 6C:
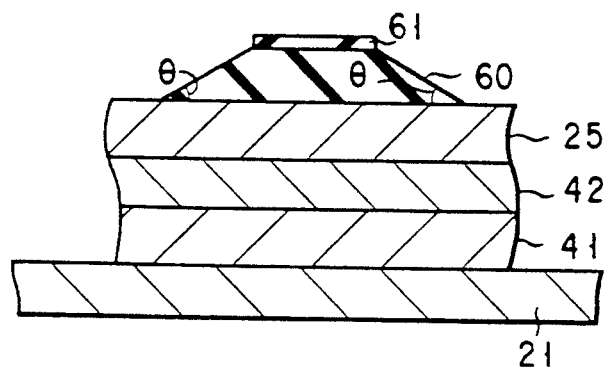

Subsequently, the SiN film 61 and the SiO$_2$ film as shown in FIG. 6B are etched by a chemical dry etching method using a CF$_4$+O$_2$, which method is employed in a semiconductor manufacturing process. The etching rates of a CF$_4$+O$_2$ gas with respect to the SiN and SiO$_2$ films can be controlled by changing the mixing ratio of O$_2$ in the gas. Therefore, by properly selecting the mixing ratio of O$_2$ in the gas, the taper angle of each end portion of the magnetic insulating layer 60 can be set to be about 30° or less. The SiN and SiO$_2$ films become a state as shown in FIG. 6C by removing the resist layer 62 after the etching.

Figure 6D:
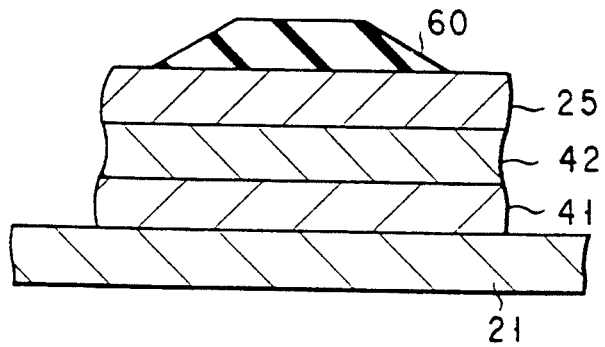

Lastly, as shown in FIG. 6D, the SiN film 61 is removed by etching upon properly selecting the mixing ratio of O$_2$ in a CF$_4$+O$_2$ gas. Various conditions in the processes shown in FIGS. 6A to 6D must be selected in consideration of the shape, size, and the like of the magnetic insulating layer 60 at the final stage.

By manufacturing a magnetic insulating layer having a small taper angle $\theta$ in this manner, a magnetization stabilizing film or an MR layer can be reliably formed on the magnetic insulating layer. Therefore, a deterioration in magnetic characteristics, caused by stepped portions due to the thickness of a magnetic insulating layer, can be prevented. In addition, a leakage magnetic field generated, in the active region, by the magnetization stabilizing film or the MR layer formed on the magnetic insulating layer can be prevented.

Furthermore, if a metal is used as a material for a magnetic insulating layer, a material for which the etching rate of a CF$_4$+O$_2$ gas is different from the etching rate of the gas with respect to the magnetic insulating layer is used as a mask material in place of SiN. If, for example, W or Nb is used for a material for a magnetic insulating layer, Mo is selected as a mask material. A mask material is selected in this manner, and the mixing ratio of O$_2$ in a CF$_4$+O$_2$ gas is properly selected, thereby setting the taper angle $\theta$ of each end portion of the magnetic insulating layer to be 30° or less.

EXAMPLE 3

Figure 7A:
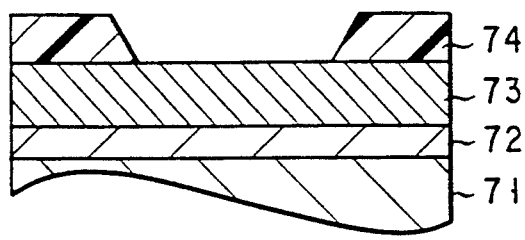

FIGS. 7A to 7E are sectional views showing a magnetoresistance sensor according to still another embodiment of the present invention. As shown in FIG. 7A, for example, in order to control the orientation of a high-coercive-force film, for example, a Cr film is formed on a substrate 71 so as to form an undercoating layer 72 having a thickness of 0.1 μm. As described above, this undercoating layer 72 controls the orientation of the high-coercive-force film and also serves as a shunt bias layer.

Subsequently, for example, a CoCr alloy film is formed on the undercoating layer 72 by deposition or sputtering, thus forming a high-coercive-force film 73 having a thickness of 30 nm. In addition, a resist layer is formed on the high-coercive-force film 73, and a resist layer corresponding to an active region is removed to form a mask 74.

Figure 7B:
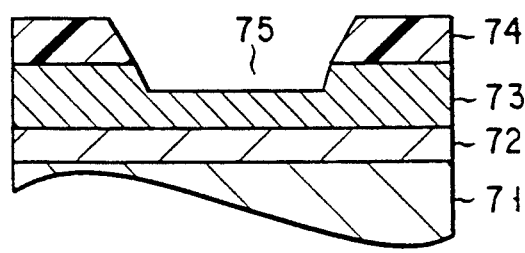
Figure 7C:
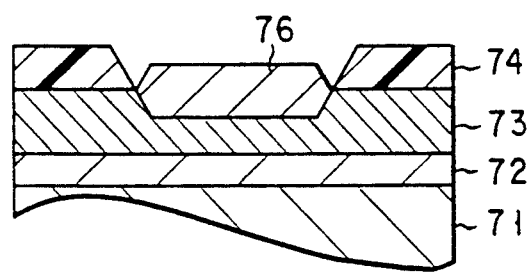

As shown in FIG. 7B, the high-coercive-force film 73 is etched to a depth of 5 nm by ion milling, reverse sputter etching, or the like to form a recess portion 75. As shown in FIG. 7C, for example, a Cr film is formed in the recess portion 75, thus forming a magnetic insulating layer 76 having a thickness of 10 nm. At this time, since the magnetic insulating layer 76 is very thin, and no leakage magnetic field is generated, the influence of a leakage magnetic field can be neglected.

Figure 7D:
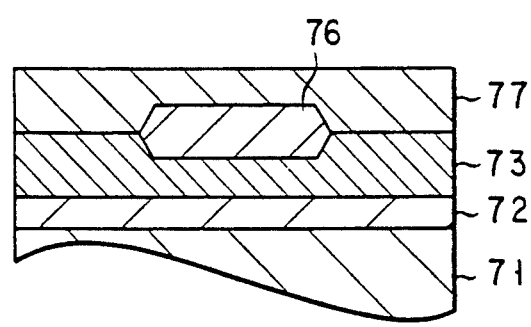

Subsequently, as shown in FIG. 7D, the mask 74 is removed by acetone or the like, and an NiFe alloy film is formed on the resultant structure by deposition or sputtering, thus forming an MR layer 77 having a thickness of 30 nm. At this time, impurities and the like adhering to each end portion of the high-coercive-force film 73 on which the mask 74 has been formed are removed by reverse sputter etching. In this case, since the magnetic insulating layer 76 is etched together with the high-coercive-force film 73, the thickness of the magnetic insulating layer 76 is preferably ensured to a degree that exchange coupling is broken between the high-coercive-force film 73 and the MR layer 77.

Figure 7E:
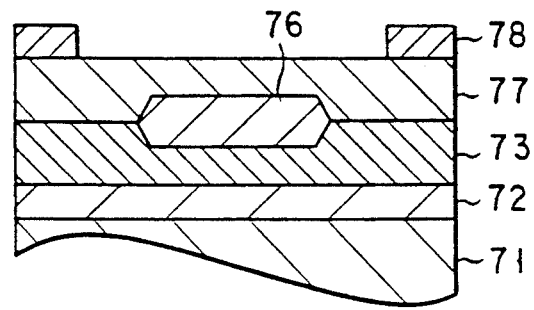

Lastly, as shown in FIG. 7E, an electrical conductive layer 78 consisting of Cu or the like is formed on the MR layer 77. This electrical conductive layer 78 is then patterned.

In the magnetoresistance sensor obtained in this manner, the magnetic insulating layer 76 can satisfactorily break the exchange coupling between the high-coercive-force film 73 and the MR layer 77. In addition, since the thickness of the portion, of the magnetic insulating layer 76, which protrudes above the surface of the high-coercive-force film 73 is small, the magnetic influence of the stepped portions of the magnetic insulating layer 76 can almost be neglected. Therefore, the MR layer 77 is free from a deterioration in magnetic characteristics.

In this embodiment, a shunt bias method is used as a method of applying a transverse bias. However, an SAL bias method using a soft magnetic film may be used as a method of applying a transverse bias. In addition, even if an antiferromagnetic film is used in place of the highcoercive-force film 73, the film can be formed in the same manner as in the embodiment.

EXAMPLE 4

Figure 8:
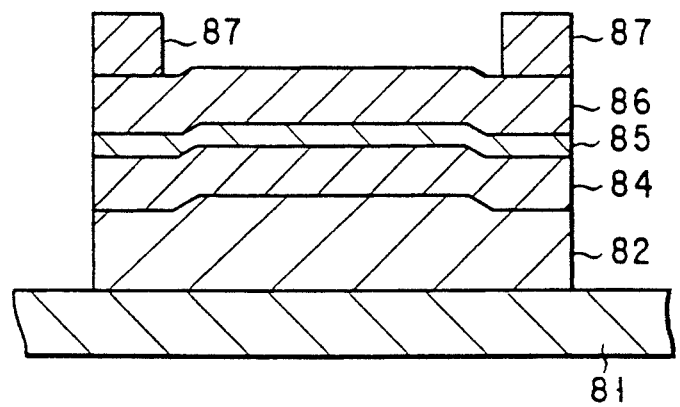

FIG. 8 is a sectional view showing a magnetoresistance sensor having a non-exchange coupled type MR layer. This magnetoresistance sensor is manufactured as follows. An antiferromagnetic film 82 is formed first on a substrate 81. A 3-nm thick magnetic insulating layer 83 consisting of Cu or the like is then formed on a region, of the antiferromagnetic film 82, which corresponds to an active region. A 3-nm thick low-coercive-force film 84 consisting of, e.g., NiFe is formed on the magnetic insulating layer 83. A 5-nm thick nonmagnetic layer 85 consisting of, e.g., Cu and a 3-nm thick high-coercive-force film 86 consisting of, e.g., Co are sequentially formed on the low-coercive-force film 84. Lastly, an electrical conductive film 87 is formed on the high-coercive-force film 86. The non-exchange coupled type MR layer is constituted by the low-coercive-force film 84, the nonmagnetic layer 85, and the high-coercive-force film 86.

In the magnetoresistance sensor having the above-described arrangement, the antiferromagnetic film 82 serving as a magnetization stabilizing film is formed on the side of the low-coercive-force film 84 as the active region of the non-exchange coupled type MR layer. Therefore, even with the non-exchange coupled type MR layer, Barkhausen noise can be suppressed. In this case, since the thickness of the magnetic insulating layer can be set to be as small as about 3 nm, the non-exchange coupled type MR layer formed on the magnetic insulating layer is free from a deterioration in magnetic characteristics.

EXAMPLE 5

Figure 9:
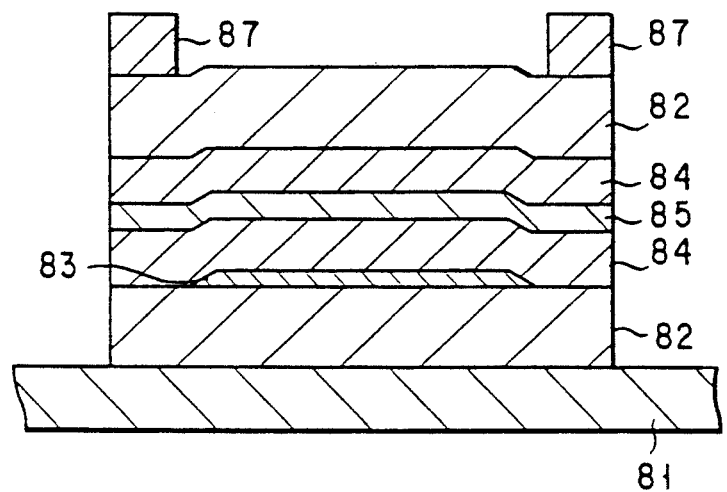

FIG. 9 is a sectional view showing a magnetoresistance sensor having a spin valve type MR layer according to the present invention. This magnetoresistance sensor is manufactured as follows. A 14-nm thick antiferromagnetic film 82 consisting of, e.g., FeMn is formed, as a magnetization stabilizing film, on a substrate 81. A 3-nm thick magnetic insulating layer 83 consisting of, e.g., Cu is then formed on a region, of the antiferromagnetic film 82, which corresponds to an active region. A 4-nm thick low-coercive-force film 84 consisting of, e.g., NiFe is formed on the magnetic insulating layer 83. A 2-nm thick nonmagnetic layer 85 consisting of, e.g., Cu, an 8-nm thick low-coercive-force film 84, and a 14-nm thick antiferromagnetic film 82 consisting of, e.g., FeMn and serving as a magnetization fixing film are sequentially formed on the low-coercive-force film 84. Lastly, an electrical conductive film 87 is formed on the antiferromagnetic film 82. The spin valve type MR layer is constituted by the low-coercive-force film 84, the nonmagnetic layer 85, the other low-coercive-force film 84, and the antiferromagnetic film 82.

In the magnetoresistance sensor having the above arrangement, the antiferromagnetic film 82 as a magnetization stabilizing film is formed on the side of the low-coercive-force film 84 as the active region of the spin valve type MR layer partially through the magnetic insulating layer 83. Therefore, even with the spin valve MR layer, Barkhausen noise can be suppressed. In this case, since the thickness of the magnetic insulating layer can be set to be as small as about 3 nm, the spin valve type MR layer formed on the magnetic insulating layer is free from a deterioration in magnetic characteristics.

EXAMPLE 6

Figure 10:
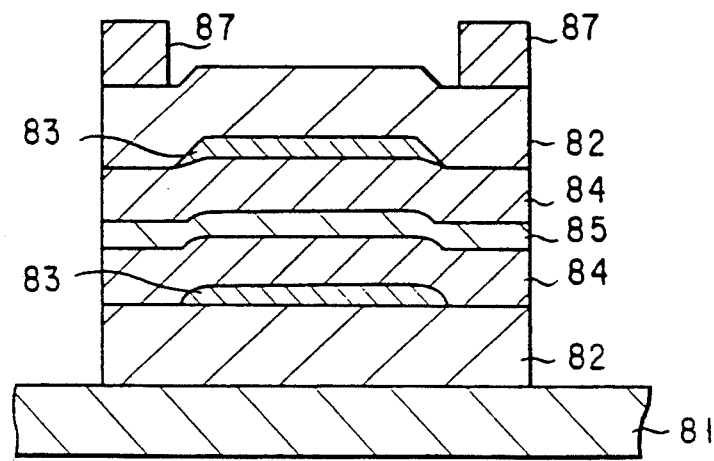

FIG. 10 is a sectional view showing a depth current scheme magnetoresistance sensor according to the present invention. This magnetoresistance sensor is manufactured as follows. A 14-nm thick antiferromagnetic film 82 consisting of, e.g., FeMn is formed first, as a magnetization stabilizing film, on a substrate 81. A 3-nm thick magnetic insulating layer 83 consisting of, e.g., Ti is then formed on a region, of the antiferromagnetic film 82, which corresponds to an active region. An 8-nm thick low-coercive-force film 84 consisting of, e.g., NiFe is formed on the magnetic insulating layer 83. A 4-nm thick nonmagnetic layer 85 consisting of, e.g., Cu and an 8-nm thick low-coercive-force film 84 are formed on the low-coercive-force film 84. In addition, a 3-nm thick magnetic insulating layer 83 consisting of, e.g., Ti is formed on a region, of the low-coercive-force film 84, which corresponds to an active region. A 14-nm thick antiferromagnetic film 82 consisting of, e.g., FeMn is then formed on the magnetic insulating layer 83. Lastly, an electrical conductive film 87 is formed on the antiferromagnetic film 82. The depth current scheme MR layer is constituted by the low-coercive-force film 84, the nonmagnetic layer 85, and the other low-coercive-force film 84.

In the magnetoresistance sensor having the above arrangement, since the two low-coercive-force films 84 serve as active region, the antiferromagnetic films 82 are respectively formed on the two low-coercive-force films 84 through the magnetic insulating layers 83. Therefore, even with the depth current scheme MR layer, Barkhausen noise can be suppressed. In this case, since the thickness of the magnetic insulating layer can be set to be as small as about 3 nm, the depth current scheme MR layer formed on the magnetic insulating layer is free from a deterioration in magnetic characteristics.

In Examples 4 to 6, an MR layer and a magnetization stabilizing film may be stacked on each other such that they are magnetically coupled to each other at two end regions thereof with an exchange coupling force higher than that at the remaining region (active region). Therefore, in Examples 4 and 5, a magnetization stabilizing film may be arranged above an MR layer. Note that a magnetization stabilizing film in Examples 4 to 6 may be constituted by a high-coercive-force film or an artificial lattice film.

In addition, as methods of manufacturing magnetic insulating layers for the magnetoresistance sensors in Examples 4 to 6, various methods such as those described in Examples 1 to 3 may be employed.

As has been described above, in the magnetoresistance sensor of the present invention, a bias magnetic field strong enough to cancel a demagnetized field can be applied to only the end portions of the MR layer, while an excessive longitudinal bias magnetic field which causes a deterioration in the sensitivity of the sensor can be suppressed in the active region. In addition, since the magnetic insulating layer formed on the active region is thin, the adverse influence of a leakage magnetic field can be prevented. Furthermore, since the magnetic insulating layer is thin, no stepped portions are formed because of this layer. Therefore, a deterioration in the characteristics of the magnetization stabilizing layer or the MR layer can be prevented.

In addition, if an undercoating layer is formed to control the orientation, of a magnetization stabilizing layer, which influences the characteristics thereof, the formation of the magnetization stabilizing layer can be performed before the formation of an MR layer, an insulating layer, and the like. As described above, according to the arrangement of the magnetoresistance sensor of the present invention, the sensor is easy to manufacture, and various manufacturing methods may be employed.

Furthermore, if Cr is selected as a material for an intermediate layer, and a Cr film is formed by a oblique sputtering method, a bcc(100)-oriented film can be formed. If this Cr film is used as an undercoating layer, and a CoNi film is formed on the Cr film to obtain a high-coercive-force film, CoNi is hcp(101)-oriented. With this operation, anisotropy can be imparted to the high-coercive-force film. Moreover, by setting the magnetic anisotropy of this high-coercive-force film in the track width direction of the MR layer, the effect of the magnetization stabilizing film can be enhanced, and the adverse influence of anisotropy dispersion can be prevented.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

We claim:

1. A magnetoresistance sensor for detecting a magnetic field on the basis of a change in electric resistance of a magnetoresistance layer, comprising a substrate, said magnetoresistance layer, a high-coercive-force film for stabilizing magnetization of said magnetoresistance layer, and an electrical conductive layer formed on said magnetoresistance layer or said high-coercive-force film,
   wherein said magnetoresistance layer and said high-coercive-force film are stacked on each other such that said layers are magnetically coupled to each other at two end regions thereof with an exchange coupling force higher than that at a remaining region.

2. A sensor according to claim 1, wherein a magnetic insulating layer is arranged between said magnetoresistance layer and said high-coercive-force film.

3. A sensor according to claim 2, wherein a thickness of the magnetic insulating layer is within the range of from 1 to 10 nm.

4. A sensor according to claim 1, wherein said magnetoresistance layer comprises a layer selected from the group consisting of a non-exchange coupled type magnetoresistance layer, a spin valve type magnetoresistance layer, and a depth current scheme magnetoresistance layer.

5. A sensor according to claim 4, comprising a non-exchange coupled type magnetoresistance layer constituted by a low-coercive-force film, a non-magnetic film, and a high-coercive-force film.

6. A sensor according to claim 4, comprising a spin valve type magnetoresistance layer constituted by a low-coercive-force film, a nonmagnetic layer, a low-coercive-force film, and an antiferromagnetic film.

7. A sensor according to claim 4, comprising a depth current scheme magnetoresistance layer constituted by a low-coercive-force film, a nonmagnetic layer, and a low-coercive-force film.

8. A sensor according to claim 1, wherein said magnetoresistance layer comprises a single-layer film essentially consisting of an NiFe alloy.

9. A sensor according to claim 1, further comprising an undercoating layer for controlling orientation of said high-coercive-force film.

10. A sensor according to claim 1, wherein a transverse bias is applied to said magnetoresistance layer by a method selected from the group consisting of a shunt bias method and an SAL bias method.

11. A magnetoresistance sensor for detecting a magnetic field on the basis of a change in electric resistance of a magnetoresistance layer, comprising a substrate, said magnetoresistance layer, a high-coercive-force film for stabilizing magnetization of said magnetoresistance layer, and a conductive layer formed on said magnetoresistance layer or said high-coercive-force film,
   wherein a magnetic insulating layer is arranged between said magnetoresistance layer and said high-coercive-force film, and an end face of said magnetic insulating layer has a tapered surface.

12. A sensor according to claim 11, wherein an angle defined by the tapered surface and a horizontal plane is not more than 30°.

13. A magnetoresistance sensor for detecting a magnetic field on the basis of a change in electric resistance of a magnetoresistance layer, comprising:
   a magnetic insulating island layered on an active region of the magnetoresistance layer;
   a high-coercive-force film layered on the magnetic insulating island and in direct contact with a non-active region of the magnetoresistance layer such that the high-coercive-film is magnetically coupled with the magnetoresistance layer, creating a longitudinal bias in the non-active region of the magnetoresistance layer, and fully suppressing any magnetic field leakage where the active-region meets the non-active region.

14. A magnetoresistance sensor according to claim 13, wherein the high-coercive-force film further comprises one continuous layer.

* * * * *